United States Patent Office 3,504,234
Patented Mar. 31, 1970

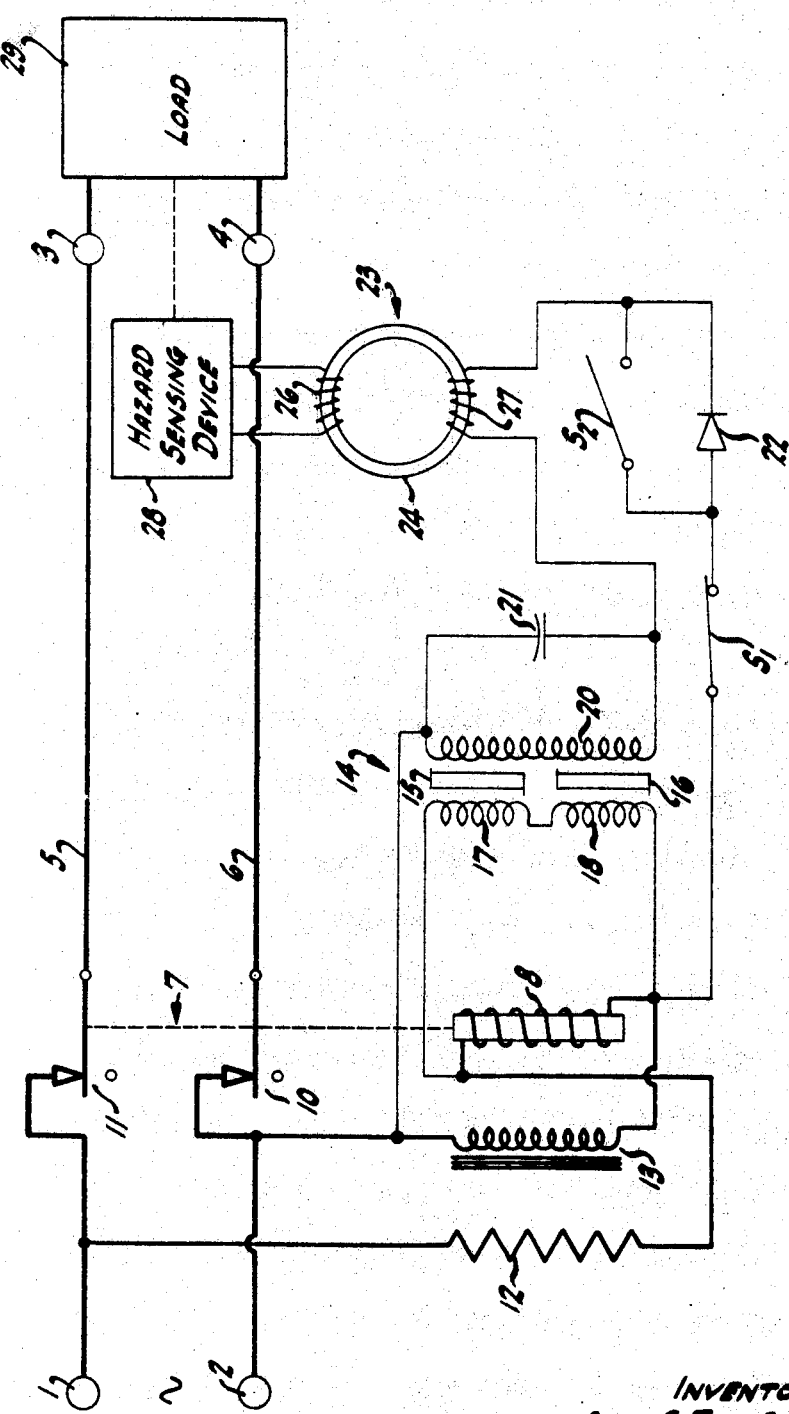

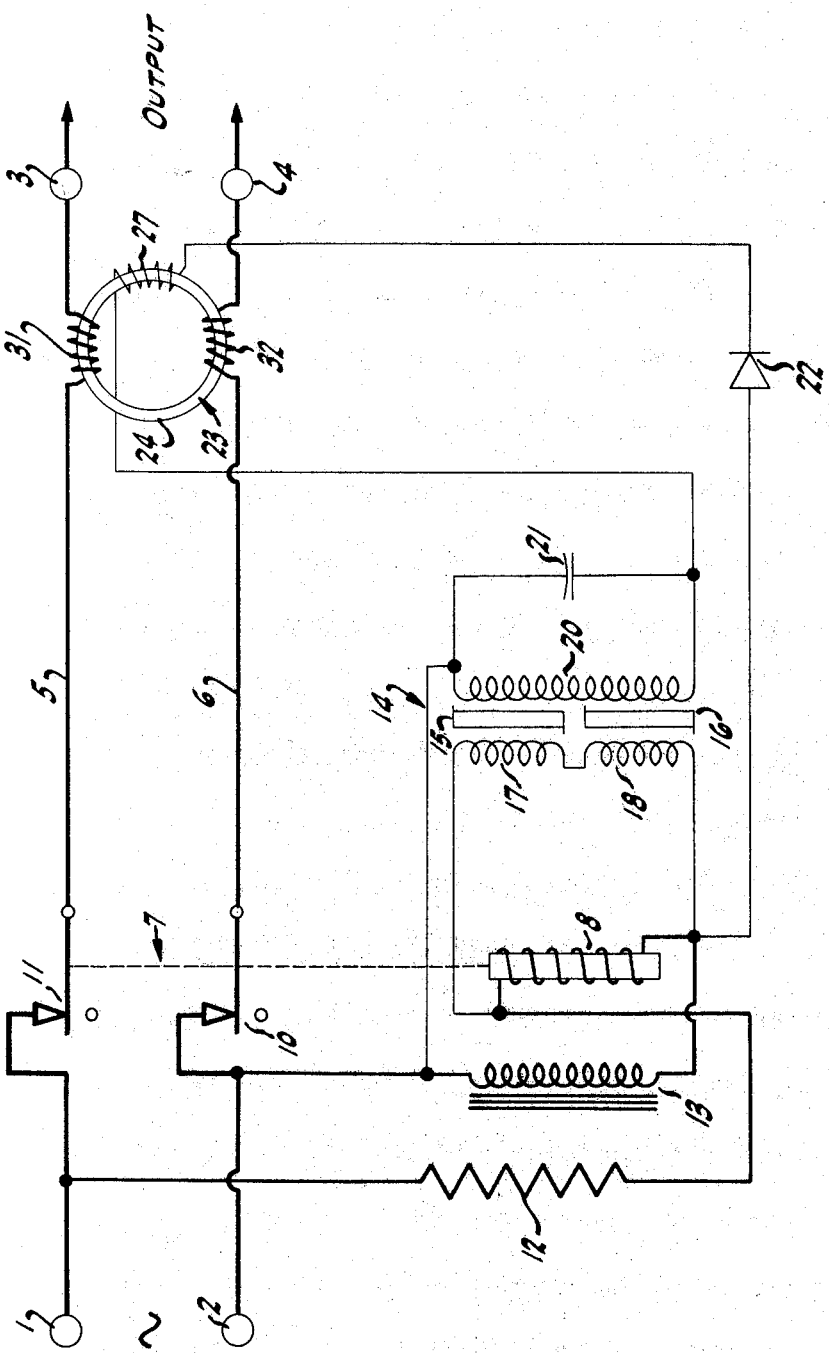

3,504,234
ELECTRIC CONTROL SYSTEM
Alan S. Fitzgerald, Mill Valley, Calif.
(1400 Geary Blvd., San Francisco, Calif. 94109)
Continuation-in-part of application Ser. No. 532,962,
Mar. 9, 1966. This application Oct. 14, 1968, Ser.
No. 767,322
Int. Cl. H02h 3/28, 7/00
U.S. Cl. 317—27                                  7 Claims

ABSTRACT OF THE DISCLOSURE

This invention provides a fail-safe protective circuit incorporating the control winding of a magnetic amplifier in series with a semiconductor device and signal generator across an alternating-current power supply. Gate windings of the amplifier control operation of protection means so that a generated signal, or semiconductor failure, operates the protection means.

---

The present application is a continuation-in-part of my prior copending application Ser. No. 532,962, filed in the U.S. Patent Office on Mar. 9, 1966, now abandoned.

There has been developed a wide variety of electrical control and protective circuits and systems, and the present invention is directed to improvements in this general field. As an example, British Patent Number 28,186 illustrates circuitry for protecting electrical distribution systems. U.S. Patent No. 1,398,620 to Beard shows a protective device that may be considered a predecessor to many modern protective circuits; my prior U.S. Patents Nos. 1,985,562 and 3,160,867 are also exemplary of developments in this field.

Many of the essential components of control and protective systems, as for example relays, resistors, transformers and the like, have long-established records of dependability, and are thus generally acceptable in applications of this character. However, some of the more recently developed devices, such as semiconductor elements, which have been available and in use for much less extended periods of time are regarded with a degree of uncertainty as to their suitability for use in safety or protection circuits. It has been considered that if semiconductor devices are to be so used, the circuits in which they are included must be so devised that failure of any such element is self-indicating, i.e., failure of the element itself will also protect the circuit. The achievement of such a result has been denoted as a "Fail-safe" characteristic.

The basic semiconductor characteristic is that of unilateral conduction. Such an element, if subjected to an improper operating condition can fail as a result of disruption of the semiconductor junction so as to leave in its place an open circuit. Again, if overloaded or subject to other harmful effect it can become, instead of a unilateral conductor, a bilaterally conducting short circuit. In order to achieve fail-safe operation of the circuit incorporating one or more semiconductor devices, it is necessary to produce the same electrical result whether the semiconductor becomes open-circuited or short-circuited.

It is an object of my invention to provide a control or protection circuit of the character described which is automatically removed from service in the event of open circuit of an included semiconductor element.

It is another object of my invention to provide such a control circuit which is automatically removed from service should the semiconductor device become bilaterally conducting.

It is a further object of my invention to provide a protective circuit incorporating a semiconductor and magnetic amplifier in circuit with a signal generator responsive to a hazard-sensing device for actuating protection means upon receipt of hazard signals, or semiconductor failure.

It is yet another object of my invention to provide a protective system for supplying a load circuit from an alternating source and capable of detecting an incipient failure of insulation in the load circuit and possessing fail-safe characteristics with respect to an included semiconductor element.

It is particularly noted that the invention of this application is generally applicable to systems employing semiconductor devices and is ilustrated in connection with a simple diode and magnetic amplifiers for ease of explanation.

The present invention is illustrated as to particular preferred embodiments in the accompanying drawings, wherein:

FIGURE 1 is an electrical diagram of a preferred embodiment of the present invention in basic form; and FIGURE 2 is an electrical diagram of the present invention as applied to the detection of leakage currents of a low magnitude, as may occur as a result of incipient deterioration of the insulation in an electrical device or system.

Referring now to FIGURE 1 of the drawings, I show a pair of input terminals 1, 2 for connection to a source of alternating-current power and a pair of output terminals 3, 4 for connection across a load circuit with conductors 5 and 6 connecting the input and output terminals. I show, also, at 7 a double-pole, circuit-opening relay having an A.C. operating coil 8 and normally closed contacts 10 and 11. The operating coil 8 is connected to be energized from the conductors 5, 6 in series with a resistor 12 and an inductance, or choke coil 13. The connections with 5, 6 are made between the relay contacts 10, 11 and the input terminals 1, 2, so that openings of the contacts does not de-energize the operating coil 8. The value of the resistance of 12 is relatively high compared with the impedance of the relay coil 8 so as to cause the coil 8 to operate in a circuit having approximately a constant current characteristic.

I show also in the diagram a magnetic amplifier, or saturating reactor 14 having a pair of like cores 15 and 16 and gate windings 17 and 18, each having like numbers of turns and each wound on one of the two cores. I show also a control winding 20 which embraces both of the two cores 15 and 16. The gate windings 17 and 18 are themselves connected in series, in opposite sense, so as to be decoupled from the control winding 20 in the accustomed manner. The two series-connected gate windings are connected in parallel with the relay winding 8, so that the substantially constant current delivered by the resistor 12 divides between the branched circuit formed by the relay winding 8 and the gate windings 17 and 18, in accordance with the respective impedances of these two paths.

When no control current flows in the control winding 20, the impedance of the windings 17, 18 in series is considerably greater than that of the coil 8. In consequence, only a small portion of the current delivered by the resistor 12 flows in the windings 17, 18. Thus a preponderant portion of the current in 12 flows in the relay winding 8, sufficient to operate the relay 7. On the other hand, if the saturating reactor 14 is saturated by the presence of a control current in the winding 20, the impedance of the windings 17, 18 in series is considerably lower than that of 8. As a result, the current divides so that most of the current from 12 flows in the windings 17, 18 and very little through the winding 8, not enough to operate the relay 7.

Control current for the winding 20 is provided by means of a circuit consisting of a diode 22 and a magnetic amplifier 23 comprising a core 24 and a gate winding 27. This circuit, which carries a current of a very low value in comparison with that flowing in the resistor 12, is connected across the coil 13 so as to be energized by the alternating voltage drop across the reactance 13. This voltage does not vary over any substantial range nor does the small current in this magnetic amplifier circuit affect in any significant degree, other than by its presence in 20, the flow of current in the circuits supplied by the resistor 12.

It will be recognized by those skilled in the art that the above-described structure comprises what is known as a half-wave, self-saturating type of magnetic amplifier, and that it furnishes to the control winding 20 intermittent unidirectional current. Accordingly, the operation is improved by connecting a capacitor 21 across the winding 20.

Assuming for the purpose of explanation that no external MMF be applied to the core 23, it will be noted that normally there will be flow of current in the control winding 20 due to the self-saturating action resulting from the presence of the diode 22. Thus the cores 15, 16 of the saturating reactor 14 will be saturated by this current so that the impedance of the gate windings 17, 18 will be low; most of the current from 12 will flow, therefore, in 17, 18 so that relay 7 will not be actuated.

If now a small unidirectional MMF be applied to the core 24 by any additional external instrumentality having a sense oppoiste to the MMF resulting from the flow of current in 27, in accordance with the manner of operation of a self-saturating magnetic amplifier, the current in 27 and in the control winding 20 may be reduced substantially to zero. This will cause the impedance of 17 and 18 to be greatly increased so that very nearly all of the current delivered by the resistor 12 will flow in the relay winding 8 causing the relay 7 to operate. Consequently the relay contacts 10, 11 will be opened by such external effect.

I show, also, solely for purposes of explanation, two switches $S_1$ and $S_2$, the former in series with the diode 22 and the latter in parallel therewith. These switches form no part of the structure of my invention but are useful in explanation of diode failure. In the positions in which these switches are depicted they do not in any way affect the operation of the system. They are shown solely to facilitate the description and understanding of my invention, as now follows.

If switch $S_1$ be considered as open, we bring about the situation which would exist if the diode 22 should fail so as to result in an open circuit, that is to say, complete interruption of the current in the control coil 20. Clearly, as previously explained, this results in operation of the relay 7. Alternatively, if $S_1$ and $S_2$ be both considered as closed, this results in a condition identical with that which would exist if the diode 22 should fail in such a way as to become bilaterally conduction; that is to say, a short circuit. In the absence of any rectifying element in the circuit the only flow of current in this control coil 20 would be a very minute alternating current. This is true because the coil 20 presents a relatively low resistance to direct or unidirectional current but presents a very high impedance to alternating current. The presence of this extremely small alternating current in 20 results in substantially zero saturating effect upon 14. Accordingly, under this condition, again, the relay 7 is operated. Since the relay is thus operated when the diode fails in either of two contrary modes, a "Fail-safe" characteristic is attained. Although a capacitor is generally regarded as an acceptable component in safety circuits, it is of interest to note that failure of the capacitor 21 likewise operates the relay 7.

The structure of my invention as hereinbefore described may be usefully applied to any control or safety system of any kind from which there may be derived a D.C., unidirectional or alternating MMF to be applied to the core 24 of the magnetic amplifier 23. I show in FIGURE 1 a generalized application of the present invention in which a hazard-sensing device 28 is illustrated as having an electrical output connected across a winding 26 about the core 24 of the magnetic amplifier and operating in response to some type of hazard, or condition, of a load circuit 29 in turn connected across the output terminals 3 and 4. The hazard-sensing deivce 28 may comprise any of a large number of different types of sensing devices, and, these are sometimes termed transducers. These elements possess the property of converting energy from one physical form into energy of a different physical form. This latter physical form is, in many instances, an electrical quantity, and the present invention provides that the output of the hazard-sensing device shall be an electrical signal. Possibly the best known example of a device of this general type is the thermocouple, or other temperature-sensing developments.

The device illustrated in FIGURE 1 and indicated therein as a hazard-sensing device may be susceptible of influence by many different physical and/or chemical effects too numerous to fully enumerate. As for example, the device may detect and produce an output signal in response to the presence of dangerously high or low stresses, pressures or temperatures. The device may also operate in response to loss of vacuum, for example, or, possibly, the presence of undesirable or toxic radiation or gases. It is to be noted that a characteristic of such devices is that the electrical output thereof is normally of a very low magnitude: it will be appreciated that the magnetic amplifier 23 of the present invention is admirably suited to operate upon low magnetic signals. As shown in FIGURE 1 of the drawings, the control winding 26 of the magnetic amplifier 23 is energized by the output of the hazard-sensing device 28, and, typically, in accordance with the invention, this energization may be a current of the order of a few micro amperes or less.

According to the operation of my invention, under safe or normal circumstances, no current will be delivered by the hazard-sensing device to the magnetic amplifier control winding 26. Accordingly, as hereinbefore explained, there will normally be a flow of current in the control winding 20 of the amplifier 14 and the relay 7 will not be actuated. The polarity of current passed through the control winding by the hazard-sensing device 28 is of such a polarity as to establish an MMF in opposition to that resulting from the flow of current in the winding 27. Thus, when a signal current from the sensing device flows in the coil 26, the flow of current in the winding 27, and thus in the control winding 20 of amplifier 14, is reduced substantially to zero. As explained above, this results in the operation of the relay 7 to open the contacts 10 and 11 and interrupt the supply of power to the load 29.

Considering further my present invention as applied, for example, to protection of an electrical device or system to interrupt current thereto upon the occurrence of leakage currents which may be of a low order of magnitude, such as may result from incipient deterioration of conductor insulation or the like, reference is made to FIGURE 2 of the drawings. I show in this figure one typical example of my "Fail-safe" control circuit which is of particular value and utility and which illustrates an application utilizing alternating-current excitation. According to this example and referring again to FIGURE 2, I provide upon the core 24 a pair of windings 31 and 32 having relatively few numbers of turns, as compared to the control winding 27, and connected in series with the main conductors 5 and 6 between input and output terminals. It will be seen that these windings 31 and 32 carry the load current; accordingly, they are formed of conductors of appropriate cross-section.

The windings 31, 32 have like numbers of turns and are connected in opposite sense, relative to the flow of current from the input terminals 1, 2 to the output terminals 3, 4 and are preferably bifilar wound with good insulation therebetween. Thus the core 24 is unaffected by flow of normal alternating current from the source connected to 1, 2 to any load circuit that may be connected across terminals 3, 4. In effect, the excitation applied to the core 24 through the instrumentality of the two windings 31 and 32 upon the magnetic amplifier 23 is identical with that which would result from a flow of current in a single control winding of the same number of turns of either 31 or 32, if this current be equal to the difference, if any, between the current, so to speak, flowing outward through 31 and returning through 32.

According to the accustomed wiring practice, one of the power lines operates at a potential above that of ground, and may be referred to as the "Line" wire; the other will be connected to ground and this one is usually called the "Neutral" or "Ground" conductor. For the purpose of explaining the operation of my invention it is to be supposed that, in the drawing, the input terminal 1 is connected to the "Line" and that terminal 2 receives the "Neutral" connection. According to this polarity, the winding 31 is to be connected in the conductor 5 in the sense whereby, during the half-cycle in which current derived from the drop across the inductance 13 flows in the winding 27, the half-cycle of current in 31 exerts an MMF in opposition to that of 27. As above described, the polarity of 32 is opposite to that of 31.

In normal operation it will be seen that any load circuit having no electrical fault or defect will be energized from the source connected to the terminals 1, 2 and supplied with power, according to its demand, through the circuit of my invention. Under these circumstances there will be current in the circuit of elements 20, 22 and 27, a substantial current in windings 17, 18 and very little current in coil 8 so that the relay will remain inoperative.

Let it be now supposed that the load device develop an insulation defect, perhaps of an incipient nature such that there may be a flow of current through the insulation of the load device, possibly of a nondestructive magnitude, to ground. This leakage current, in addition to such load current as may be drawn by the load device, flows through the winding 31. However, whereas the load current returns to the source through the other winding 32, this is not the case in respect to the leakage current which returns to the source through a ground path which does not traverse the circuit of my invention. This leakage current, thus is not found in the winding 32 so that the core 24 is subjected to an MMF in accordance with the magnitude of the leakage current and the numbered turns of winding 31. This MMF is alternating. During the half-waves when, because of the blocking action of 22, there is no current in the winding 27, this MMF is nugatory. During the opposite half-waves when the diode 22 is conducting the resultant, MMF from the windings 31 and 32 opposes the excitation due to 27 and nullifies the latter so that the current in 27, and, therefore, in the control winding 20 is reduced substantially to zero.

Under this condition the current delivered by the resistor 12 in large part shifts from the gate windings 17, 18 to the operating coil 8 to operate the relay 7 and open the contacts 10 and 11 so as to disconnect the defective load device.

With the cessation of the leakage current in winding 31, the current in the winding 27 will be re-established so that the relay 7 will reclose. If the fault should have cleared itself, flow of current to the load will be resumed. If, as is more probable, the insulation defect is of a permanent nature, the relay 7, if of the self-resetting type, will operate again and continuous repeated operation will ensue. For some applications the use of a manually reset relay may be favored. Another arrangement which I prefer and to which the structure of my invention lends itself readily is as follows.

Referring to the division of current between the coil 8 and the gate winding 17, 18, it will be obvious to those skilled in the art that when current flows in the control winding 20, while the impedance of the gate windings can be very greatly decreased, it cannot be reduced completely to zero. Thus when there is no leakage current and no circuit action to cause operation of the relay 7, a very small current will be found in the relay coil 8 of a magnitude substantially less than that required for pick-up. If is convenient to select a type of relay that has a relatively large pick-up to drop-out ratio, such that the normal residual current in 8, though insufficient to effect pick-up, is enough to retain the relay in the open contact position. This precludes repeated operation following a fault that yet does not require access to the apparatus, as is the case with a manually reset relay. According to my preferred above-described arrangements, when a leakage current occurs, the relay 7 operates and locks in the open contact position; when the fault has been cleared, current to the load device may be restored by momentarily interrupting the power supply from the source to the terminals 1 and 2. This causes the relay to reset.

In a situation in which the leads connecting the terminals 1 and 2 to the source of power are not individually identified so that which of these may be the "ground" line and which the so-called "hot" line is indeterminate, some structure additional to that shown in the drawings is called for since the magnetic amplifier 23 operates only on one half-wave. To furnish the desired action when either terminal 1 or terminal 2 may be the "hot" line, there may be provided two similar magnetic amplifiers 23 including diode 22. The two duplicate cores 24, each having a gate winding 27, may be assembled so that the pair may be embraced by a single winding 31 and a single winding 32. In order to be operative on either half-wave one of the windings 27 should be reversed in polarity.

In the foregoing example it is not, however, essential that two complete sets of material such as is shown in the drawing be provided. For example, if the saturating reactor 14 be also duplicated so that there are two pairs of gate windings 17, 18 and both these pairs, in series, be connected in parallel with the relay winding 8, failure of either one diode will produce a condition differentiating only very slightly from that already described in reference to the single sided circuit illustrated in the drawing, the current in 8 being increased and the relay 7 actuated. Alternatively, if desired, a single saturating reactor 14 may be provided with duplicate windings 20, and the windings and magnetic design of 14 may be so ordered as to cause the relay to be actuated if the control MMF applied to 14 be reduced to one-half instead of reduced to zero.

In one practical embodiment of my invention which I have constructed and studied, the cores 17 and 18 consisted of toroids of a nickel iron alloy known in the trade as "deltamax," a grain-oriented 50-percent-nickel iron alloy. These cores have a cross-section of 0.063 square inch. The single core 24 comprised a toroid of another alloy known as "supermalloy" and had a cross-section of 0.016 square inch. With this set-up, it was found that a one-half horsepower single-phase induction motor could be supplied and could be started up through the circuit shown in the drawings without any noticeable tendency of the relay to operate. Yet when an artificial high resistance leakage path-to-ground was applied to the load circuit the relay operated with a leakage current of less than two milliamperes.

Although the present invention has been described with respect to particular preferred embodiments, it is not intended to limit the invention to the exact terms of the description or the details of the drawings, but, instead, reference is made to the appended claims for a precise definition of its true scope of the invention.

That which I claim is:

1. A fail-safe protective circuit comprising switching means in a circuit to be protected and including an operating circuit element connected across said circuit to be protected, control means including a control winding having a high alternating current impedance and coupled in circuit with the operating circuit element of said switching means, a magnetic amplifier connected in the circuit to be protected and including a first winding, and a semiconducting device coupling the first winding of said magnetic amplifier in circuit with said operating circuit element and the control winding of said control means for energizing the control means with unidirectional current in the absence of faults in the circuit to be protected and failure of the semiconducting device.

2. A circuit as set forth in claim 1 further defined by said control means comprising a saturable reactor having the control winding thereof connected in series with said magnetic amplifier winding, said semiconducting device, and an inductor connected in series with the operating circuit element of said switching means; and additional windings connected across the operating circuit element of said switching means.

3. A circuit as set forth in claim 2 further defined by said magnetic amplifier having a pair of additional windings connected one in each energizing line of the circuit to be protected for inducing a voltage in said first winding upon circuits faults to thereby reduce current through the saturable reactor control winding and thus increase current through the operating element of said switching means.

4. The protective circuit of claim 1 wherein said switching means comprises a relay having normally open contacts disposed in the energizing lines of a circuit to be protected, said operating element comprises a relay coil, and said coil is connected in series with a large resistor and an inductor across said energizing lines, said control means comprises a saturable reactor also having gate windings connected across said relay coil, and said semiconductor device connects said saturable reactor control winding and first magnetic winding in series with said inductor for saturable reactor control energization by the inductor voltage as opposed by the magnetic amplifier winding voltage.

5. A fail-safe protective circuit for a load device comprising protection means for said load device and having an operating circuit element for actuating same, input terminals connected across said operating circuit element and adapted to have an alternating-current voltage applied therebetween, control means having a control winding with a high alternating current impedance and connected in circuit with said operating circuit element for switching current therethrough in accordance with current through said control winding, a signal generator connected to said load device and producing an output responsive to a fault therein, and a semiconductor device coupling the output of said signal generator to said control winding in opposition to voltage applied to said control winding whereby said control winding is de-energized to switch current through said operating circuit element upon the occurrence of load fault or semiconductor failure to actuate said protection means.

6. The protective circuit of claim 5 further defined by said control means comprising a saturable reactor having gate windings connected across said operating circuit element and a control winding connected across said input terminals through said semiconductor device and said signal generator output.

7. The protective circuit of claim 5 further defined by said protection means comprising a relay having contacts in electrical leads supplying said load device and the operative circuit element thereof comprising a relay coil, said input terminals being connected to said leads supplying the load device on the power-supply side of said relay contacts, and said control means comprising a saturable reactor having gate windings connected across said relay coil whereby reduction in current through said control winding increases gate winding impedance to cause current to pass through said relay coil and actuate the relay for opening the relay contacts.

References Cited

UNITED STATES PATENTS

| | | | |
|---|---|---|---|
| 1,667,655 | 4/1928 | Clothier et al. | 317—27 X |
| 1,674,477 | 6/1928 | May | 317—27 X |
| 2,594,022 | 4/1952 | Horton | 317—27 X |
| 2,594,372 | 4/1952 | Wattenberger | 317—27 X |
| 2,678,181 | 5/1954 | Geyer et al. | 317—27 X |
| 3,018,417 | 1/1962 | Colaiaco et al. | 317—27 X |
| 3,312,865 | 4/1967 | Gambale | 317—27 |

LEE T. HIX, Primary Examiner

H. FENDELMAN, Assistant Examiner

U.S. Cl. X.R.

307—88; 317—33, 52